(No Model.)

E. KIPPER & E. W. PERRY, Jr.
PLATE HOLDER AND SHIFTER.

No. 422,804. Patented Mar. 4, 1890.

Witnesses:
Robt Everett
Dennis Sumby

Inventors:
Emil Kipper
Enoch W. Perry Jr.
By James L. Norris
Atty.

UNITED STATES PATENT OFFICE.

EMIL KIPPER, OF ADAMS, MASSACHUSETTS, AND ENOCH WOOD PERRY, JR., OF NEW YORK, N. Y.

PLATE HOLDER AND SHIFTER.

SPECIFICATION forming part of Letters Patent No. 422,804, dated March 4, 1890.

Application filed March 21, 1889. Serial No. 304,145. (No model.)

*To all whom it may concern:*

Be it known that we, EMIL KIPPER, a subject of the Emperor of Germany, residing at Adams, in the county of Berkshire and State of Massachusetts, and ENOCH WOOD PERRY, Jr., a citizen of the United States, residing at New York, in the county of New York and State of New York, have invented new and useful Improvements in Plate Holders and Shifters, of which the following is a specification.

This invention has for its object to provide a novel and efficient camera-box or plate-holder for a camera, whereby the exposed plates may be successively moved from the camera-box into a plate-receiving box or chamber located beside the camera-box and so attached or connected thereto as to stand stationary or immovable while the exposed plates are slid into such receiving box or chamber.

The invention consists in the combination of devices having the mode of operation hereinafter described, and set forth in the claims, reference being made to the accompanying drawings, in which—

Figure 1:
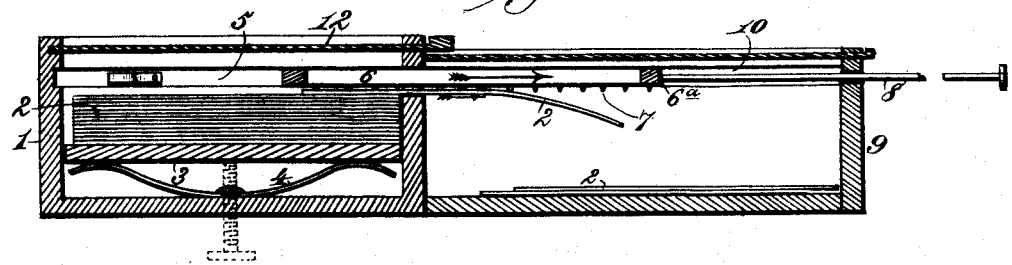
Figure 2:
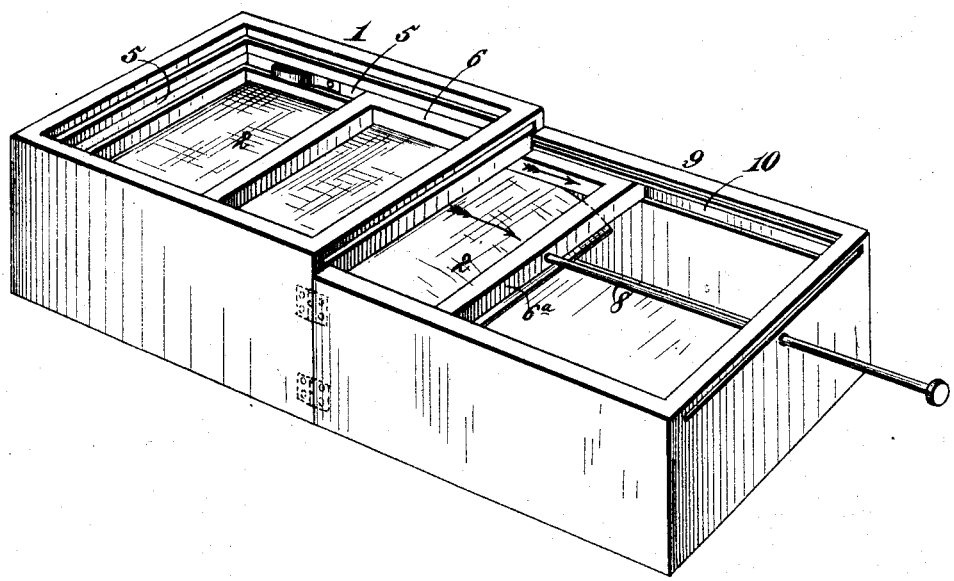
Figure 3:
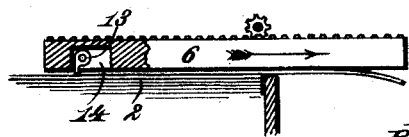

Figure 1 is a vertical longitudinal section of a camera with a plate holder or receiver attached embodying my invention. Fig. 2 is a perspective view of the same. Fig. 3 is a view showing a modification.

In the said drawings, the reference-numeral 1 denotes a box or chamber of any suitable size or form adapted to receive a stack or pile of negative films or plates 2, resting upon a support 3, which is fed forward by a spring 4, or by an equivalent—such as a screw—whereby the unexposed plates or films are fed forward into position for successive exposure in the chamber 1. Within said chamber are grooves 5, forming ways or guides in which a slide 6 moves in a plane parallel with the films, said slide consisting of a rectangular frame, upon the under sides of two parallel arms or members whereof are mounted teeth 7, one or more, of any suitable form and material, adapted to engage the exposed surface of the uppermost plate or film 2. The slide may be provided, if desired, with similar teeth upon the arm or member 6ª, and its parallel arms move in openings in the wall of the plate-holder, the slide being actuated by a rod, wire, or cord 8.

Upon one side of the box or chamber 1 is arranged a plate-receiving chamber 9, consisting of a box of any suitable size and form, connected with the camera-box 1 either permanently or detachably by any suitable fastening. This receiving-chamber is provided with ways or guides 10, which are practically continuous with the grooves 5 in the camera-box and co-operate therewith in supporting the slide 6 and aid in imparting rectilinear movement thereto.

An exposing slide or cover 12, located in front of and independent of the plate-moving slide, is mounted in grooves in the camera-box 1 to cover the unexposed films stacked or piled therein.

The operation of the apparatus is as follows: The chamber 1 being charged with plates or films 2, piled upon the supports 3, and the plate-receiving chamber 9 being arranged in proper position, the slide 12 is withdrawn to give the proper exposure to the plate or film adjacent thereto. When the exposure is completed and the slide 12 replaced, the slide or frame 6 is operated by means of the rod, cord, or similar device 8 to move it across the plate-receiving chamber 9 in a direction away from the camera-box, while both the chamber and box remain stationary or immovable relatively to each other, whereupon the teeth 7 upon said slide engage with the upper film or plate and withdraw it through an opening in the wall of the chamber 1 adjacent to the plate-receiving box, said opening being so placed as to permit the passage of the upper exposed plate only. After the removal of said plate the stack or pile of films is fed forward by the spring or screw-impelled support 3 to bring the succeeding film 2 into proper position, while the removed plate is dropped into the bottom of the plate-receiver, the slide-frame 6 being pushed back to normal position in readiness to operate upon the next succeeding film after the latter has been exposed. The retrograde movement of the slide-frame 6 may be produced by a rod or cord attached to the side 6ª, or it may be restored by the withdrawing device 8, provided the latter is rigid. The slide-frame 6 may also be operated by pinions which mesh with racks upon the parallel sliding arms thereof, said pinions being carried by a shaft journaled at any convenient point and operated from the outside either by a crank on said shaft or by any simple multiplying gearing, whereby a more rapid movement is given the slide-frame 6.

The plate-receiver 9 may be a permanent adjunct of the camera-box 1, or it may be connected therewith by hinges and swung back when not in use. It may also be attached by clamps and removed at pleasure. Moreover, while the plates or films are shown as removed to a laterally-arranged chamber, it is evident that they may by the same or similar means be removed into the lower part of the camera-box 1.

While conveniently adapted for flexible films, the invention may be used in conjunction with either flexible or rigid plates or films.

The plate-moving slide, as shown, is open, so that when it is retracted into the camera-box 1 a plate can be exposed through the slide by opening the cover 12.

Instead of using a fixed tooth or teeth on the slide-frame 6, as in Fig. 1, we may employ a swinging tooth 13, as in Fig. 3, which will engage a plate to move it into the receiving chamber, while such tooth will swing into a recess or opening 14 in the slide-frame 6 when the latter is retracted into the camera-box.

The rack-and-pinion mechanism indicated in Fig. 3 is a very desirable means for operating the open slide-frame 6, in that it serves to rapidly move the latter in both directions.

We do not claim herein anything that is claimed in our application for Letters Patent, Serial No. 312,569, filed March 21, 1889.

Having thus described our invention, what we claim is—

1. The combination of a plate-holding camera-box, a plate-receiving chamber located beside the same, and an open slide-frame adapted for the exposure of a plate therethrough, having a tooth to engage a plate in the camera-box, and capable of sliding from the latter across the receiving-chamber, while the box and receiving-chamber remain stationary, and in such movement pulling the exposed plate from the camera-box into the receiving-chamber, substantially as described.

2. The combination of a plate-holding camera-box, a plate-receiving box beside the same, an open slide-frame having a tooth to engage a plate in the camera-box and capable of sliding from the latter across the receiving-box, while both boxes remain stationary or immovable, and in such movement pulling the exposed plate from the camera-box into the receiving-box, and an exposing-slide located in front and independent of the plate-moving slide, substantially as described.

3. The combination of a plate-holding camera-box, a support which is adjustable therein toward the exposure-opening, a plate-receiving chamber beside the camera-box, an open slide adapted for the exposure of a plate therethrough, having a tooth to engage a plate in the camera-box, and movable from the latter across the receiving-chamber, while the latter remains stationary, and in such movement pulling the exposed plate from the camera-box into the receiving-chamber, and an exposure-slide arranged in front and independent of the plate-moving slide, substantially as described.

4. The combination of a camera-box for holding a stack of plates, a plate-receiving chamber beside the camera-box, a slide for successively moving the plates, and a rack-and-pinion mechanism for reciprocating the slide, substantially as described.

In testimony whereof we have affixed our signatures in presence of two witnesses.

EMIL KIPPER.
ENOCH WOOD PERRY, Jr.

Witnesses to signature of E. Kipper:
HY. SCHOMBURG,
H. H. SCHÜRMANN.

Witnesses to the signature of E. W. Perry, Jr.:
ANDREW J. QUINN,
THOMAS FORD.